Dec. 18, 1934.    W. A. MINKLER    1,985,051
CONTROL SYSTEM
Filed April 17, 1931

WITNESSES:

INVENTOR
William A. Minkler
ATTORNEY

Patented Dec. 18, 1934

1,985,051

UNITED STATES PATENT OFFICE 1,985,051

CONTROL SYSTEM

William A. Minkler, Pittsburgh, Pa., assignor to Westinghouse Electric & Manufacturing Company, a corporation of Pennsylvania Application April 17, 1931, Serial No. 530,925

4 Claims. (Cl. 175—320)

My invention relates to control systems and more particularly to control systems which may be utilized to operate in timed sequence, a plurality of current-responsive devices.

In control systems at present known in the art, mechanical means, such, for example, as contact segments disposed to make engagement with contact fingers, are utilized to establish circuits, whereby a plurality of current-responsive devices may be operated in timed sequence. Such mechanical means, however, are subject to wear and misalignment and, consequently, require maintenance to ensure good operation.

It is, therefore, an object of my invention to provide a simple, reliable and inexpensive electrical control system for controlling a plurality of current-responsive devices in timed sequence.

It is also an object of my invention to provide for actuating, in timed sequence, a plurality of current-responsive devices by electronic means.

A further object of my invention is to provide for actuating, in timed sequence, a plurality of current-responsive devices by non-mechanical means.

Other objects of the invention will hereinafter become apparent.

This invention, accordingly, is disclosed in the accompanying drawing and comprises the features of construction, the combination of elements and the arrangement of parts which will be exemplified in the construction hereinafter set forth and the scope of the application of which will be indicated in the claims.

Figure 1:
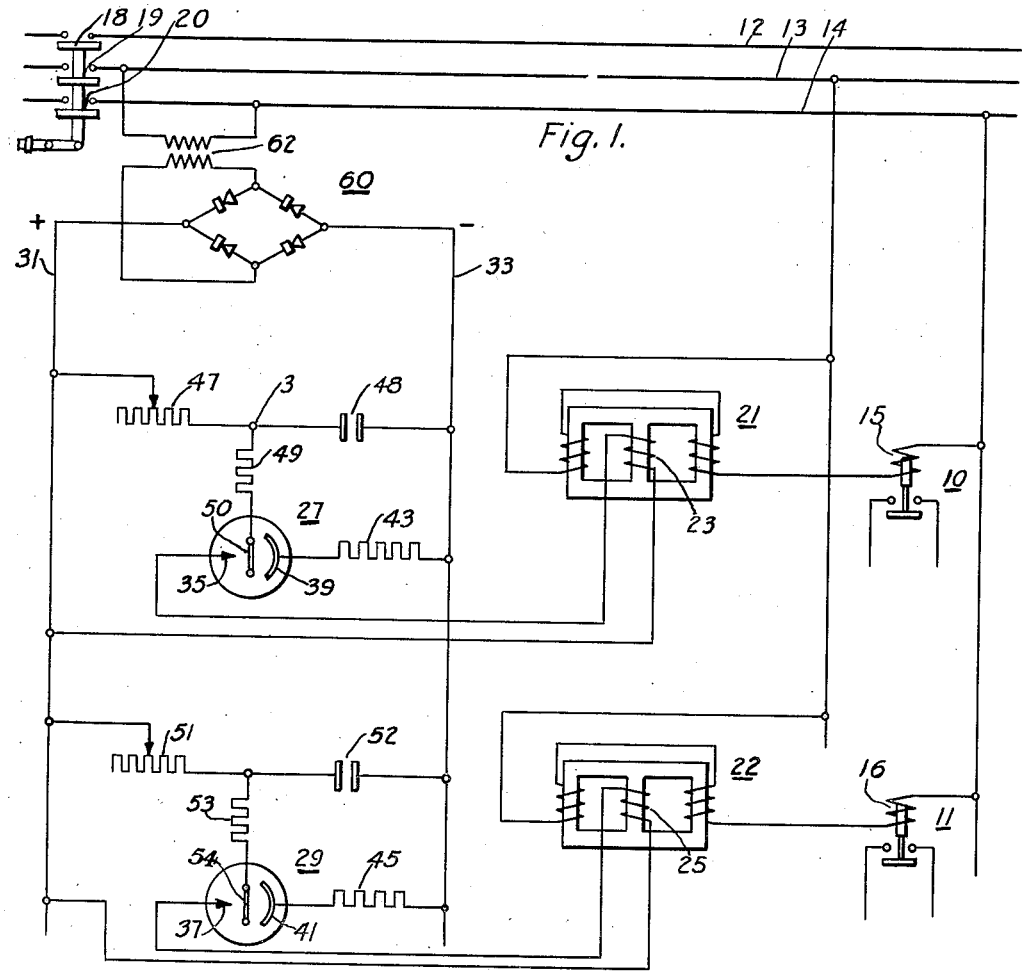
Figure 2:
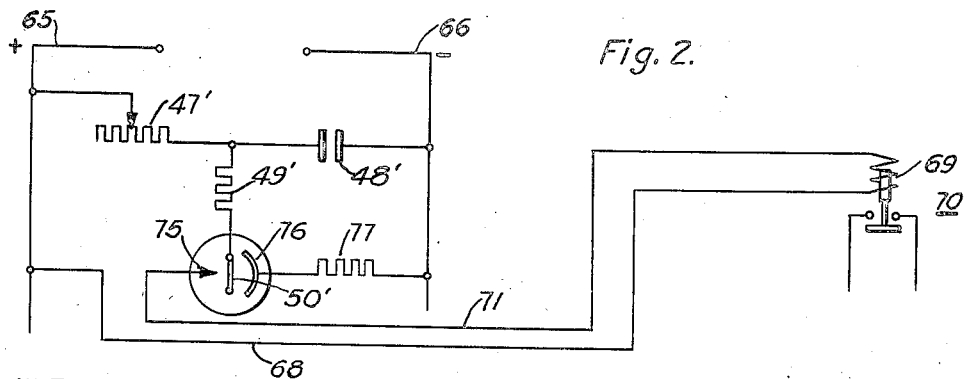

For a fuller understanding of the nature and the objects of the invention, reference should be had to the following detailed description, taken in connection with the accompanying drawing, in which:

Figure 1 is a diagrammatic view of a control system constructed in accordance with my invention, and Fig. 2 is a diagrammatic view of a modified form of the control system.

In general, my invention provides for actuating in timed sequence, a plurality of current-responsive devices by utilizing a plurality of electric-discharge devices connected in circuit relation to a plurality of timing circuits that have different time constants. The discharge devices and their respective timing circuits are connected, individually, in circuit relation to each of the current-responsive devices. In this manner, the sequential operation of each of the current-responsive devices depends upon the time constant of the timing circuit with which it is associated.

Therefore, it will be readily understood that the current-responsive devices may be operated in timed sequence by varying the time constant of the timing circuit with which it is associated.

Referring now to the drawing, 10 and 11 represent, generally, a plurality of current-responsive devices, such for example, as relays which may be utilized to control electric motors, the accelerating contactors of motors, or any other electric apparatus (not shown). Although only two relays are shown, it will be readily understood that any number of relays may be controlled in accordance with my invention.

As shown, the actuating coils 15 and 16 of the relays are respectively connected in series with the reactors 21 and 22 and are connected across one phase of a three-phase supply circuit designated by the numerals 12, 13 and 14. The supply circuit, in turn, is connected to a main three-phase source by line switches 18, 19 and 20, thereby continuously energizing the reactors and the relays when the line switches are closed.

Under this condition, the current which flows through the actuating coils of the relays is limited by the impedance of the reactors to such an extent that the relays will not operate. On the other hand, when the impedance is reduced, the relays will operate. In order to provide for reducing the impedance to thereby permit sufficient current to flow to operate the relays, the reactors are provided with windings 23 and 25, respectively, which may be positioned on the central core of each of them.

When windings 23 and 25 are sufficiently energized by direct current, the cores are magnetized to such value that the relative change in flux caused by the alternating current is less than that when the windings are not energized by direct current. The impedance may thus be materially decreased by the direct-current excitation.

To cause the relays 10 and 11 to operate in timed sequence, the windings 23 and 25 are respectively connected, in series-circuit with a plurality of electric-discharge devices 27 and 29 and suitable resistors 43 and 45 between a direct-current source represented by a positive conductor 31 and a negative conductor 33. The electric-discharge devices 27 and 29, sometimes referred to as grid-glow tubes, comprise, respectively, anodes 35 and 37 and cathodes 39 and 41, which are generally called the principal electrodes, and control electrodes 50 and 54 associated therewith. A control electrode is generally referred to as the grid of a grid-glow tube. Inasmuch as the construction and function of the grid-glow tubes 27 and 29 are similar, the description of the grid-glow tube 27 only will be given. In a grid-glow tube, the control electrode is effective only in preventing or initiating a glow discharge between the principal electrodes, but is not effective in extinguishing or controlling the discharge after it is once started.

In the operation of the grid-glow tube 27, a threshold discharge is initiated between the grid 50 and the cathode 39 when the grid potential relative to the cathode potential attains a predetermined value, depending upon the critical grid-to-cathode voltage characteristic of the tube. The cathode-to-grid threshold discharge when once initiated is self-supporting and, if sufficient voltages exist between the anode 35 and the grid 50, the said threshold discharge transfers to the anode 35, thus effecting a complete continuous discharge between the anode 35 and the cathode 39. Under this condition, that is, when a complete continuous discharge persists between the anode 35 and the cathode 39, the grid-glow tube 27 passes current in the form of an arc between the principal electrodes thereof, and the said discharge continues to exist so long as the supply conductors 31 and 33 are energized. Accordingly, a grid-glow tube functions substantially as a very sensitive relay. That is to say, when a glow discharge persists between the principal electrodes, the grid-glow tube functions to pass current in the form of an arc, thus representing the closed-circuit position of a relay, and when the glow-discharge is extinguished, the grid-glow tube functions to pass no current, thus representing the open-circuit position of a relay. Inasmuch as the grid-glow tubes 27 and 29 function substantially as very sensitive relays, they may be utilized to control the operation of the reactors 21 and 22, which, in turn, govern the operation of the relays 10 and 11. As shown, the winding 23 is connected between the positive conductor 31 and the anode 35, the winding 25 being similarly connected.

The cathode 39 is connected, through current-limiting resistor 43, to the negative conductor 33, and the cathodes of the other discharge devices are similarly connected to that conductor. It will be readily understood that functioning of the discharge devices will energize the windings on the central cores of the reactors by direct current, thereby permitting sufficient alternating current to flow to operate the relays.

To cause the relays 10, 11, etc., or other electrical devices to be controlled, to function in timed sequence, each discharge device is provided with an adjustable timing circuit, including a capacitor, a fixed resistor and a variable resistor. As shown, the variable resistor 47 and the capacitor 48 are connected between the direct-current supply conductors 31 and 33. A non-variable resistor 49 is connected between a control electrode 50 and the junction 3 of the variable resistor and the capacitor. By a similar arrangement of circuits, a capacitor 52, a non-variable resistor 53 and a variable resistor 51 are connected in circuit with the discharge device 29.

The direct-current supply conductors 31 and 33 may be connected to a source of direct current of any suitable kind such, for example, as a plurality of rectifiers designated by the numeral 60. As shown, the rectifiers are connected in circuit with the secondary of a transformer 62, the primary winding of which is connected across one phase of the three-phase supply circuit. In cases where a relatively long time delay is desired, the rectifiers are connected, as shown, to give a double-wave rectification.

In explaining the operation of the control system, it may be assumed that the line switches 18, 19 and 20 are closed; the direct-current supply conductors 31 and 33 are energized by direct current; and the relays and reactors are energized by alternating current. Under this condition, the current which flows through the coils of the relays is limited by the impedance of the reactors to such an extent that the relays will not operate. Also, the operating characteristics of the electric-discharge devices are such that no current can immediately flow between the principal electrodes to energize the windings 23 and 25 of the reactors.

Energization of conductors 31 and 33 causes charging of the capacitors 48 and 52 through the variable resistors 47 and 51, respectively. Because of the fact that the resistance value of the variable resistor 47 is less than that of the variable resistor 51, the capacitor 48 will be charged at a more rapid rate than the capacitor 52. When the capacitor 48 is charged to such an extent that the control electrode 50 attains a proper potential, relative to the principal electrodes 35 and 39, the discharge device becomes conducting and thereby permits direct current to flow between the principal electrodes 35 and 39 and through the winding 23 of the reactor 21. After a predetermined time interval, depending directly upon the value of the variable resistor 51, the discharge device 29 functions to permit direct current to flow between the principal electrodes 37 and 41 and through the winding 25 of the reactor 22.

The energization of winding 23 causes the operation of relay 10, whereas the energization of winding 25 causes the operation of relay 11. It is to be understood that the discharge devices 27 and 29, as heretofore intimated, represent but two of a series. If more than two discharge devices are employed, the operating characteristics of the respective variable resistors and timing circuits must be designed to secure the desired sequence of operation, or, if desired, selective operation.

It will be readily understood that, if the discharge current which flows between the principal electrodes is sufficiently large, it may be utilized directly to operate a plurality of relays without being aided by a reactor. Such arrangement is shown in Fig. 2, which represents the first of a series of discharge devices which may be utilized to operate, in timed sequence, a plurality of relays. Although not shown, the direct-current supply conductors 65 and 66, of Fig. 2, may be connected to a source of direct current, such as a plurality of rectifiers, as shown in Fig. 1. The operation of the circuit in Fig. 2 is similar to that shown in Fig. 1 except that the discharge current is utilized directly to operate a plurality of relays.

As shown, the discharge current flows from the positive conductor 65, through the conductor 68, the actuating coil 69 of the relay 70, the conductor 71, the principal electrodes 75 and 76 and the limiting resistor 77 to the conductor 66.

While the illustrated example constitutes a practical embodiment of my invention, I do not limit myself strictly to the exact details herein illustrated since the structure may be considerably varied without departing from the spirit of the invention as defined in the appended claims.

I claim as my invention:

1. In a control system, in combination, a plurality of grid-glow discharge devices, each of said devices having a control electrode and a plurality of principal electrodes, means including capacitors and resistors having different time constants for impressing a predetermined potential in timed sequence on the control electrodes, and means responsive to variations in current associated with each of the principal electrodes.

2. In a control system, a plurality of current-responsive devices to be actuated, a source of direct current, a plurality of grid-glow discharge devices each having a controlling electrode and a plurality of principal electrodes, said principal electrodes being connected in circuit with the current responsive devices and the source of direct current, means for varying the potential impressed upon the controlling electrodes in timed sequence, thereby causing the current-responsive devices to operate according to the functioning of the discharge devices.

3. In a control system, in combination, a grid-glow discharge device, said device having a control electrode, a plurality of principal electrodes, and a timing circuit associated with the control electrode, and a reactor, said reactor having a plurality of windings, one of said windings being connected in series with said principal electrodes.

4. In a control system, in combination, a grid-glow discharge device, said device having a control electrode and a plurality of principal electrodes, a timing circuit associated with the control electrode to make said principal electrodes conducting at an instant of time determined by the timing circuit, and means for varying the characteristics of said timing circuit.

WILLIAM A. MINKLER.